J. R. ROLLMAN.
VALVE ACTUATING DEVICE.
APPLICATION FILED MAR. 4, 1918.
1,278,022. Patented Sept. 3, 1918.
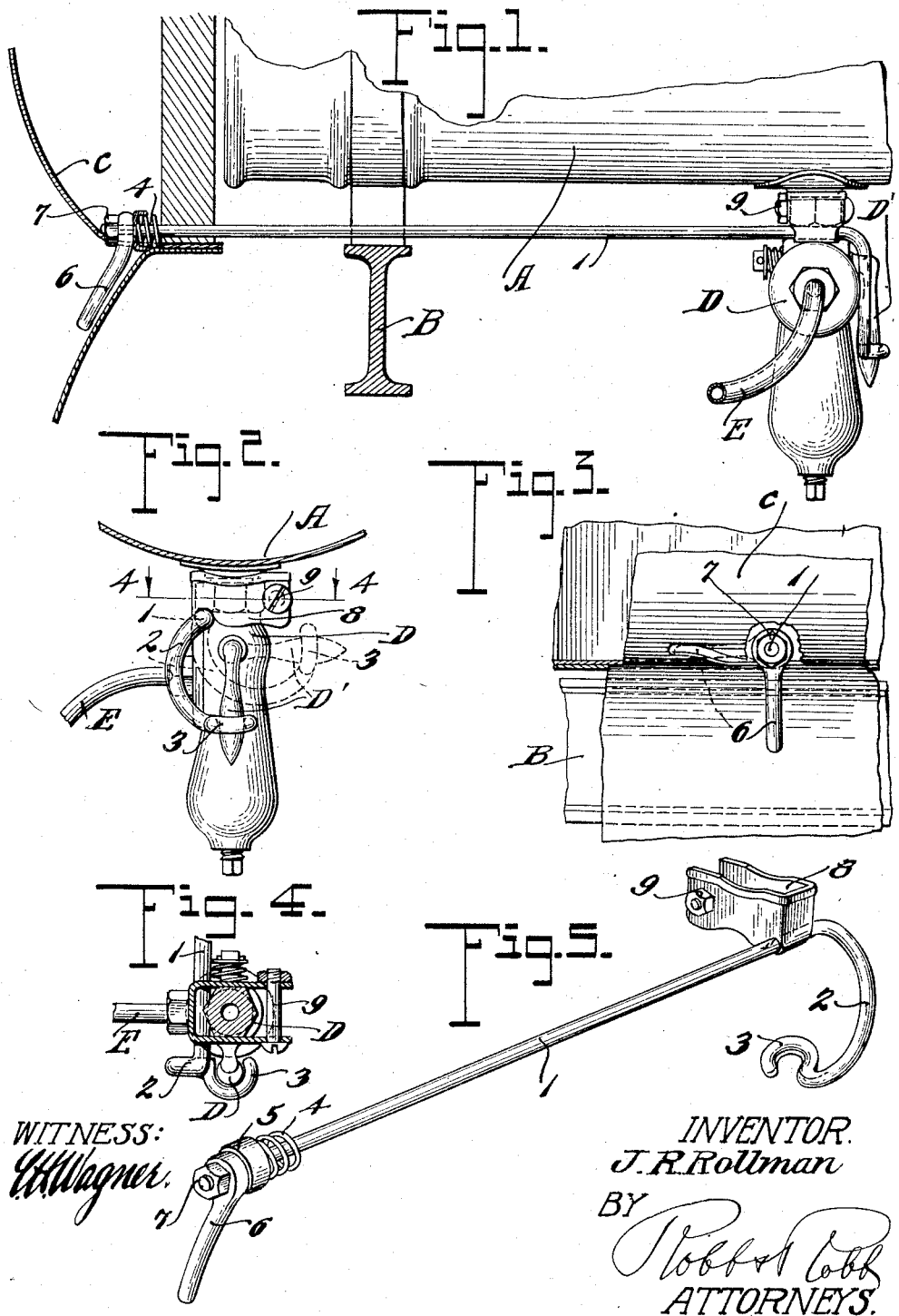

UNITED STATES PATENT OFFICE.

JOSIAH R. ROLLMAN, OF ENCAMPMENT, WYOMING.

VALVE-ACTUATING DEVICE.

1,278,022.  Specification of Letters Patent.  Patented Sept. 3, 1918.

Application filed March 4, 1918.  Serial No. 220,321.

*To all whom it may concern:*

Be it known that I, JOSIAH R. ROLLMAN, a citizen of the United States, residing at Encampment, in the county of Carbon and State of Wyoming, have invented certain new and useful Improvements in Valve-Actuating Devices, of which the following is a specification.

The present invention is designed as a useful accessory for automobiles and constitutes a valve actuator enabling manipulation of a valve on said vehicle which is ordinarily inaccessible because of its disposition beneath the vehicle except the operator crawl under the automobile or remove the flooring for the purpose of reaching said valve.

To be more specific, a certain well known type of automobile is equipped with a gasolene tank drain cock and cut-off substantially centrally beneath the body and it is very often desired to shut off this valve to effect cut off of the supply of gasolene flowing to the carbureter, as when the latter is leaky or repairs or other work is being done, but to accomplish which, as above stated, one must get down under the car to reach the drain cock and cut-off in question. Where the carbureter is prone to leak it will be apparent that quite a wastage of fuel is incurred where the machine is allowed to stand for any length of time, but owing to the inconvenience of accessibility this wastage is more often allowed to continue. My aim, therefore, has been to provide a simple device which may be readily applied and held in coöperative relation with respect to the valve and which extends to such position as will permit the operator to actuate the valve from the vehicle side without getting beneath the same or removing the flooring of the car as above suggested.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a fragmentary sectional view of a motor vehicle on which the device forming the subject matter of this invention is shown in applied position;

Fig. 2 is a view showing the device in end elevation;

Fig. 3 is a similar view showing the device from the opposite end;

Fig. 4 is a horizontal sectional view on the line 4—4 of Fig. 2; and

Fig. 5 is a perspective view of the device alone.

Throughout the following detail description and on the several figures of the drawings, similar parts are referred to by like reference characters.

Referring to Fig. 5, the article of manufacture which constitutes this invention consists of a rod 1, the inner end of which is bent at substantially a right angle to form the arm 2 which in turn terminates in a loop or eye 3. Upon the opposite end of the rod is mounted a spring 4 and a coöperating washer 5 together with a detachable handle 6 secured in position by means of the nut 7. In conjunction with this rod I employ a special form of clip 8, U-shape in form and having a transverse opening at the closed end to receive the rod and form a bearing therefor. A clamping bolt 9 is utilized to clamp the free ends of the clip to the object of support for the inner end of the rod.

Referring now to Fig. 1 showing the device in applied position, A represents the gasolene supply tank, B the chassis side, C the side of the body, and D the drain valve and cut-off for the gasolene tank from which the gasolene line or conduit E leads to the carbureter (not shown). About the upper end of the cut-off valve D the clamp 8 is disposed and tightened, the arm 2 of the rod extending downwardly at one side of the valve handle D', the eye or loop 3 of the arm engaging about the lower extremity of said handle. The other end of the rod is passed through a suitable opening in the side of the body of the vehicle so that the operating handle 6 will be disposed outside of the body at a convenient point of access adjacent to the running board. The spring 4 about the end of the rod 1 presses against the side and holds the device against binding as well as prevents rattling or accidental displacement of the arm 2 from the valve handle D'. The spring is yieldable, however, to enable the rod 1 to be shifted longitudinally for the purpose of disengaging the eye 3 from about the handle whenever it is desired to separate these parts. Obviously the spring tends to hold the arm 2 in proper engaging relation with respect to the handle D' as shown in Figs. 1 and 2. When it is desired to operate the valve handle D the operating handle 6 is rotated causing the arm 2 to shift the valve handle D' to and from the dotted line position shown in Fig. 2. The simplicity of the device and convenience of the arrangement will be apparent from the foregoing description.

Having thus described my invention, what I claim as new is:

1. The combination with a valve, of means for actuating the same comprising a rod having an arm extending therefrom and slidably engaged with the valve, and means detachably connecting the rod adjacent to the valve and constituting a bearing for the same.

2. The combination with a valve, of means for actuating the same comprising a rod engageable with the valve for shifting the same upon rotation of said rod, a clip member for clamping the rod in position upon the valve support, said clip member having a bearing in which the rod is journaled.

3. The combination with a valve, of means for actuating the same comprising a rod engageable with the valve for shifting the same upon rotation of said rod, a clip member for clamping the rod in position upon the valve support, said clip member having a bearing in which the rod is journaled, and a spring coöperating with the rod for holding the same in engagement with the valve.

4. As a new article of manufacture, a valve actuator comprising a rod having one end thereof bent at substantially right angles to form a crank arm, said arm terminating in a valve engaging loop in which the valve is slidably received, a clip constituting fastening means to support the crank arm end of the rod, and a bearing support for said rod, a handle detachably connected to the opposite end of the rod, and a tension device arranged adjacent to said handle permitting longitudinal movement of the rod.

In testimony whereof I affix my signature.

JOSIAH R. ROLLMAN.

Copies of this patent may be obtained for five cents each, by addressing the "Commissioner of Patents, Washington, D. C."